United States Patent [19]

Anderson et al.

[11] Patent Number: 5,031,690
[45] Date of Patent: Jul. 16, 1991

[54] PORTABLE UNITARY AIRCRAFT AIR CONDITIONER AND HEATER

[75] Inventors: Gordon K. Anderson, Tustin; Robert Y. Woo, Cerritos, both of Calif.

[73] Assignee: BFM Transport Dynamics Corp., Fountain Valley, Calif.

[21] Appl. No.: 382,995

[22] Filed: Jul. 21, 1989

[51] Int. Cl.⁵ .......................................... F25B 29/00
[52] U.S. Cl. .................... 165/43; 165/48.1; 62/239; 62/323.1; 62/429; 237/12.3 B; 237/12.3 R
[58] Field of Search ............................. 165/42, 43, 48.1; 62/239, 323.1, 236, 429; 237/12.3 A, 12.3 B, 12.3 R

[56] References Cited

U.S. PATENT DOCUMENTS

| | | | |
|---|---|---|---|
| 2,338,931 | 1/1944 | Gould et al. | 62/323.1 |
| 2,475,841 | 7/1949 | Jones | 62/429 |
| 2,518,284 | 8/1950 | Clark | 62/429 |
| 2,738,655 | 3/1956 | Gumpper | 62/323.1 |
| 2,862,652 | 12/1958 | Hoiby et al. | 62/323.1 |
| 2,887,853 | 5/1959 | Talmey | 62/160 |
| 3,063,251 | 11/1962 | Boehmer et al. | 62/323.1 |
| 3,218,820 | 11/1965 | Spatt | 62/239 |
| 3,415,072 | 10/1968 | White | 62/429 |
| 3,543,838 | 12/1970 | White | 62/160 |
| 3,545,222 | 12/1970 | Petranek | 62/236 |
| 4,272,967 | 6/1981 | White et al. | 62/239 |
| 4,419,866 | 12/1983 | Rowland | 62/323.1 |
| 4,551,986 | 11/1985 | Anderson et al. | 62/239 |

FOREIGN PATENT DOCUMENTS

| | | | |
|---|---|---|---|
| 3314763 | 10/1984 | Fed. Rep. of Germany | 165/43 |
| 0190641 | 11/1983 | Japan | 165/28 |
| 0771756 | 4/1957 | United Kingdom | 165/42 |

OTHER PUBLICATIONS

Devtec Corporation Publications, Model 800, 804 and 804-920.
Air-A-Plane Corporation Publications, Model 300, 354D, 652, 653, 654, 656, 1510DE, 2425, 2580DE, 2580MHP, 4490, 505ODA.
Lean Siegler Inc., Publications, Model 2452II, 2452, 1719D, 1638D, 1633-1744, H-10, HR-12, HE-104G, HG104G, H160, TSD-110, 555, 566, 570, 580, 701, 707, 718, 731, 752, 767, 779, 798, 804, 827, 839, 989, 6303, 6510, 6515.
Keco Industries, Inc., Special Purpose Equipment Brochure.
Bronswerk Special Products Publication.
British Aero Space Group Brochure EVA-25 and GCAT-200.
Japan Airport Ground Power Co. Ltd. Brochure Entitled Air Conditioning Car.
Air-A-Plane Corporation Publication on the Model 4490 Air Conditioner and Photos of the Aforementioned Taken 9-1-87.
Diesel Progress North America, pp. 4-6, Article Entitled "Aircraft Support Vehicles Use Direct Engine Drive".

Primary Examiner—John Ford

[57] ABSTRACT

A portable self contained air conditioner which has a platform base (20) with an enclosure (22) attached on top. A recropricating engine (38) is resiliently mounted on the platform with a propeller fan (44) on the front drive and a blower (46) directly attached to the flywheel on the back. A refrigerant compressor (54) is also directly coupled to the engine flywheel with a universal joint drive shaft (56). A drive shaft adapter (60) registers to the flywheel on one end and to the drive shaft on the other with the blower impeller (50) sandwiched in between. A vapor cycle refrigerant system provides the cooling effect and an electrical control system furnishes the operational direction. The engine cooling is integral with the refrigeration system utilizing an additional section of the condenser coil (66) and the same air movement supplied by the propeller fan on the engine. The preferred embodiment includes a pair of closely spaced tandem wheels on each side and the internal component location allows a balanced center of gravity for portability. The blower employs a circular outlet at right angles to the plane of the impeller directing the pressurized air to exit at 90 degrees to the plane of the blower. Optional heating is supplied by a hydraulic system in conjunction with jacket water from the engine heating the conditioned air stream.

14 Claims, 7 Drawing Sheets

PORTABLE UNITARY AIRCRAFT AIR CONDITIONER AND HEATER

TECHNICAL FIELD

The present invention relates to air conditioning in general and more specifically an air conditioning unit used to cool aircraft while on the ground using the aircraft on board air distribution systems.

BACKGROUND ART

Previously many types of portable air conditioners have been used to provide an effective means for cooling aircraft on the ground. These air conditioners historically include belt driven blowers and fans, direct driven compressors with flexible couplings direct driven motors for the condenser fans and blowers also semi-hermetic refrigerant compressors and a myriad of other combinations. Part of the novelty of the invention is the combination of the rotating drive components being directly connected to the engine without the use of speed changing or resilient drive mechanisms.

A search of the prior art did not disclose any patents that read directly on the claims of the instant invention however, the following U.S. patents were considered related:

| U.S. PAT. NO. | INVENTOR | ISSUE DATE |
|---|---|---|
| 4,419,866 | Howland | Dec. 13, 1983 |
| 4,272,967 | White et al | Jun. 16, 1981 |
| 3,543,838 | White | Dec. 1, 1970 |
| 2,887,583 | Talmey | May 26, 1959 |
| 2,738,655 | Gumpper | Mar. 20, 1956 |
| 2,338,931 | Gould et al | Jan. 11, 1944 |

Howland in U.S. Pat. No. 4,419,866 teaches a dual speed diesel engine driving a refrigerant compressor and a control system that starts and stops the engine upon temperature control demand. While the control system is not relevant the prior art driving the compressor directly by the engine is. Although not disclosed, the drive method and means for providing air flow through the con denser and evaporator sections in typical units produced by the assignee are well known in the art and include a flexible coupling or centrifugal clutch with belt driven fans and blowers.

White et al do indeed teach an air conditioning system for aircraft using a diesel engine as the prime mover. White et al approach in U.S. Pat. No. 4,272,967 is to attach an electrical generator to the diesel engine and operate the entire refrigeration system, including controls, with electrical alternating current thus generated. This prior art approach allows both conditioned air and condenser air to be moved by rotating blowers and fans coupled to electric motors. The refrigerant compressors are the semi-hermetic type with their own inherent suction gas cooled electric motors.

U.S. Pat. No. 3,543,838 issued to White discloses an air conditioning system with the refrigerant compressor provided by the truck engine radiator fan. The evaporator blower is rotated by an electric motor powered from the truck ignition system. It is apparent that this prior art while containing the relevant elements approaches the problem entirely different than the instant invention.

Talmey in U. S. Pat. No. 2,887,853 directs his intentions toward a refrigeration system for rail cars utilizing an operating shaft directly connected to the rotary element of the compressor. The fans are rotated by an electric motor, and controls selectively operate the engine at low and high speeds with a two function throttle control mechanism.

Gumpper et al are concerned with air conditioning a refrigerator car, truck or the like that consists of a unitary system mounted on a single base that is insertable and removable from a dedicated space in which it is to be used in the vehicle. A diesel engine is coupled with a conventional refrigerant compressor through a coupling device. The air movement for the condenser and radiator is provided by an individual single blower and the evaporator air is circulated by a pair of blowers all attached to single shaft driven by a set of belts from the front crankshaft of the engine.

For background purposes and as indicative of the art to which the invention relates reference may be made to the patent of Gould et al.

DISCLOSURE OF THE INVENTION

Prior art in their endeavor to optimize a mechanically driven air conditioner for cooling an aircraft have connected a blower directly to an engine and have driven fans and a refrigerant compressor through conventional mechanical systems such as belts flexible couplings and the like. The problems that arise with this type of drive are numerous, as an example, the initial alignment of a belt drive system is critical in both angular and parallel orientation requiring a substantially rigid base and frequent adjustments to maintain the exacting relationship of the belts to the sheaves. Further belts by themselves have a limited life and are selected with this in mind, also a belt drive system has a known energy loss depending upon the horsepower and speed. This loss, according to AMCA (American Mechanical Contractors Association) publication 203, varies from 4 to 10 percent average with higher fan speeds tending to have even higher losses at the same horsepower. Flexible couplings also have critical alignment problems and life limitations as with belts, and, are required to be used in conjunction with refrigerant compressors of the large variety where internal bearings are subjected to high side loading characteristics restricting the use of belt systems.

It is therefore the primary object of the invention to completely eliminate all drive systems external to the engine and directly couple all rotating components to the engine itself. This object is accomplished by attaching a propeller fan to the front end of the engine at the water pump pulley and utilizing the air moving capabilities for both engine heat removal and refrigeration system heat of rejection. While using a fan for cooling an engine radiator is notoriously old the combination is novel and eliminates the need for a second fan or at least a remotely mounted fan to accomplish both purposes. The blower is mounted to the rear of the engine with the scroll attached to the face of the flywheel housing and the blower wheel fastened by a machined hub to the engine flywheel. This connection eliminates completely problems of alignment, horsepower loss and maintenance. The refrigerant compressor is also driven in a similar manner except a universal joint drive shaft is used to place the compressor remote from the blower. The blower wheel registers upon the machined hub and the drive shaft registers on the same diameter bore on the other side of the wheel with the threaded fasteners connecting the drive shaft to the machined hub with the blower wheel sandwiched in between. The use of this arrangement allows the compressor to be far enough away from the inlet of the blower to allow unrestricted air flow and yet still provide a direct connection between the rotating elements. It will be noted that the universal joint drive shaft allows for liberal tolerance on the parallel alignment and is purposely offset 3 degrees. This approach eliminates angular misalignment problems completely. It will be seen that the primary object of the invention has been realized by this novel arrangement while combining the use of available and time proven components.

An important object of the invention is directed to an optimum drive speed of 1800 revolutions per minute (RPM). This speed is ideal for diesel engines in particular and propeller fans, however, backward inclined blower wheels characteristically operate at higher speeds. Prior art has attempted to direct connect blowers to the flywheel of an engine for operation at 3600 RPM. While this speed reduces the size of the wheel the noise level of the engine is greatly increased and the effect on the efficiency is minimal. The problem with higher speed for fans and refrigerant compressors is that the industry has not directed their attention to such speeds, therefore, very expensive development is required by the compressor manufacturers to operate at these extremes making them basically impractical at this time. The blower may operate easily at 1800 RPM if properly sized, as well as the other rotating components making this entire drive relationship not only feasible but quintessential.

Another object of the invention is the adaptation of a blower with a transverse circular outlet at a right angle to the wheel. Normally a blower housing or scroll is configured straight at the outlet and if a right angle bend is required an elbow is fitted thereupon. The present invention, instead, utilizes a novel circular outlet integral with the blower that directs the air in a spiral flow path and makes transition from one direction to the other at 90 degrees without taking up valuable space for additional duct work such as a normal elbow or right angle transition. Further the circular outlet allows the blower to be connected to an adjoining air plenum with flexible material, known in the industry as SOFT CUFF, which is a strip of impregnated fiberglass cloth wrapped around the joint and connected with a pair of conventional band clamps. This object of the invention allows the entire unit to be packaged very densely and not waste valuable space within the enclosure yielding a very small envelope for the entire air conditioner.

Still another object of the invention is the integral engine cooling radiator integrated with the refrigeration system. Cooling the engine jacket water instead of being separate, as conventionally adapted, is accomplished by circuiting the water into the extended surface tube and fin condenser coil as an additional row of tubes. This arrangement allows the engine to drive a single propeller fan accomplishing two separate and distinct purposes. First to extract the heat of rejection from the compressor in the condenser coil while, second, simultaneously removing the engine heat from the jacket water, both in the same coil. This object eliminates the necessity of two separate heat exchangers and air moving fans.

Yet another object of the invention allows the use of standard automotive wheels and tires with no other support than two sets of tandem wheels on each side. This object is accomplished by locating all of the components in a completely balanced condition such that the center of gravity of the unit is in the dead center. Trailers equipped with tandem wheels customarily employ a leveling jack on one end to create three point stability. The invention does not need this third member due to its uniform balance and it has even been found that two people standing on the bumper and jumping up and down does not effect the stability of the unit in anyway. With this arrangement the turning radius is nil as the unit will pivot around its own center furthering the maneuverability and ease of transportation.

A further object of the invention includes a simplified refrigeration and electrical control system due to the direct drive arrangement. Only an engine control system is necessary, no large generator, clutch or belt disengaging mechanism is necessary only simple direct current on/off controls and battery charging. The refrigeration components are also simplified as the speed of the engine may be manually controlled to vary the capacity according to the type of aircraft being serviced. This simplicity eliminates the necessity for hot gas bypass systems and other elaborate capacity modulation methods.

These and other objects and advantages of the present invention will become apparent from the subsequent detailed description of the preferred embodiment and the appended claims taken in conjunction with the accompanying drawings.

BEST MODE FOR CARRYING OUT THE INVENTION

The best mode for carrying out the invention is presented in terms of preferred embodiment as shown in FIGS. 1 through 7, and is comprised of a platform base 20 of structural material, preferably steel, with an enclosure 22 consisting of doors 24 and panels 26. The base 20 provides a flat surface to which mechanical components are mounted and the enclosure 22 on the top forms a negative air plenum creating an air movement path for the condenser and radiator air as well as protection from the elements.

Figure 1:
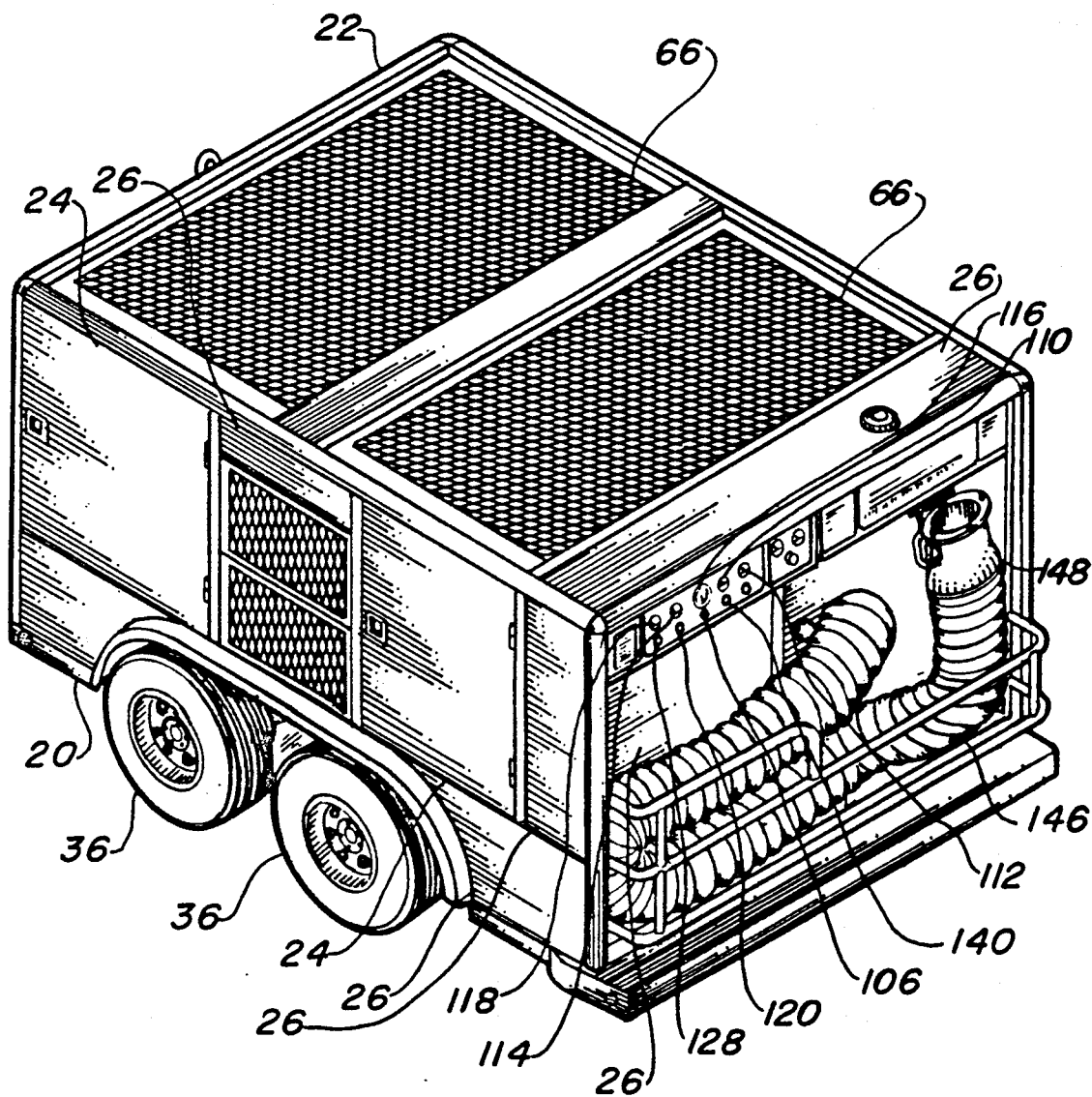
FIG. 1 is a partial isometric view of the preferred embodiment with the trailer providing the portability.
Figure 2:
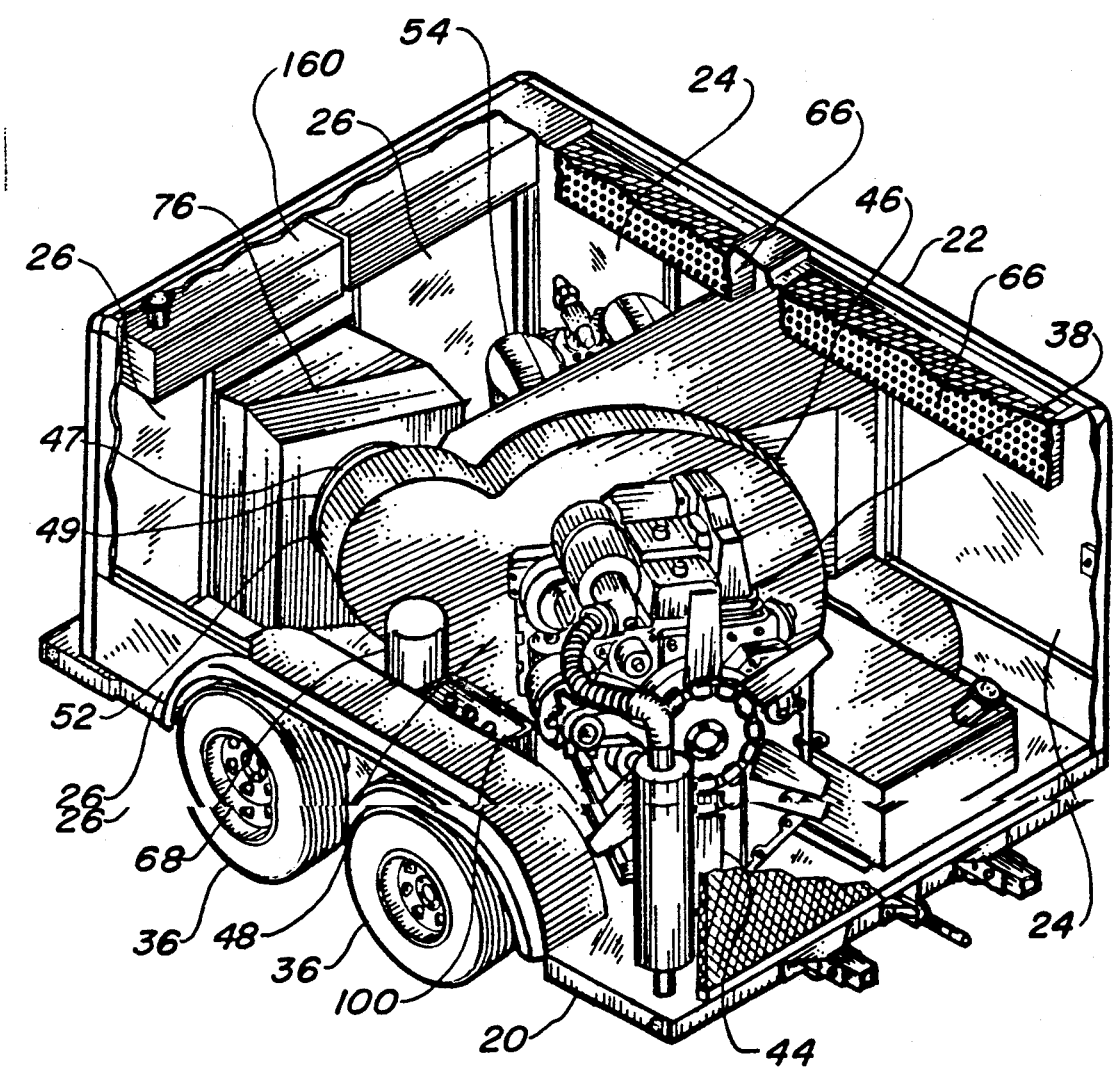
FIG. 2 is a partial isometric view of the preferred embodiment as in FIG. 1 cut away to illustrate the internal components and subassemblies.
Figure 6:
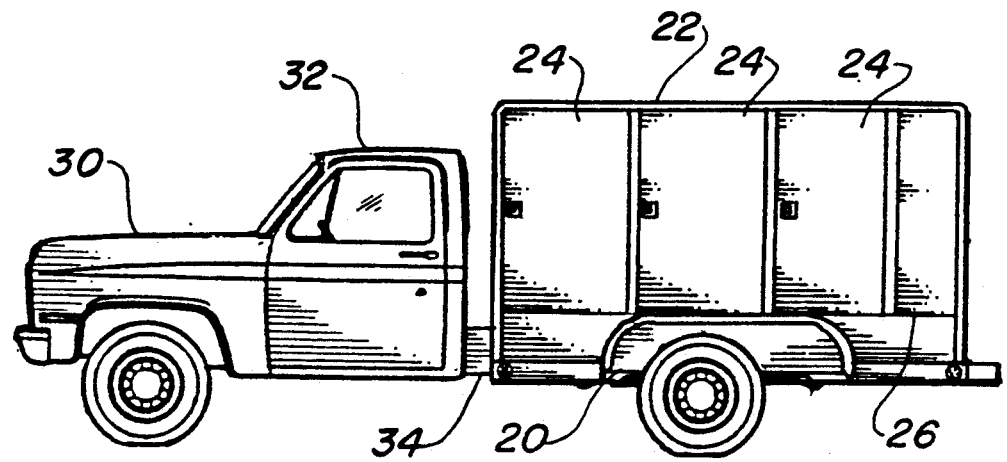
FIG. 6 is a partial isometric view of the air conditioner in the self propelled embodiment.
Figure 7:
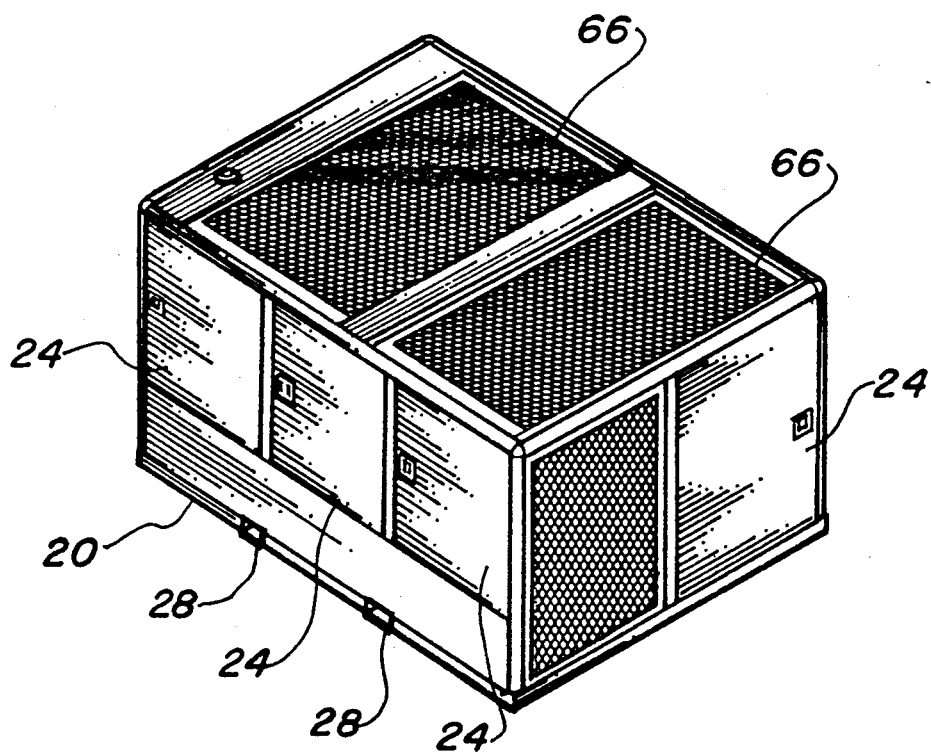
FIG. 7 is a partial isometric view of the air conditioner in the skid mounted embodiment.

The air conditioner may be skid mounted as shown in FIG. 7 or truck mounted as illustrated FIG. 6 with the most popular or preferred embodiment depicted in FIGS. 1 and 2 in a portable trailer form.

In the skid mounted version all running gear is omitted, including the fenders, with fork lift slots 28 are incorporated into the base 20 for ease of handling. The truck mounted model includes a conventional truck chassis 30 with an engine, cab 32 and frame 34 making the air conditioner completely portable and self propelled. Any type of truck chassis 30 may be utilized with equal ease provided the gross vehicle weight is compatible with the air conditioner. Gasoline, diesel, natural gas, propane etc. may be used as the fuel to drive the truck engine or any other type commercially available. The trailer embodiment may employ any type of running gear including the 4-wheel steerable variety with ackerman type hinge pins, knuckles and linkage, or a single axle with wheeled landing gear and crank leveler. The preferred embodiment is a double axle tandem wheel system. This tandem running gear consists of a pair of wheels on each side spaced together less than half of the diameter of one wheel. The center of gravity of the air conditioner, in this embodiment, is located in the center of the base 20 making the wheel loading identical or all four wheels such that further support such as stiff leg or leveling jack is unnecessary. In order to accomplish this weight balance the components are positioned on the base angularly not parallel with the sides or ends as is customary with air conditioners of this type (See FIG. 2).

Figure 3:
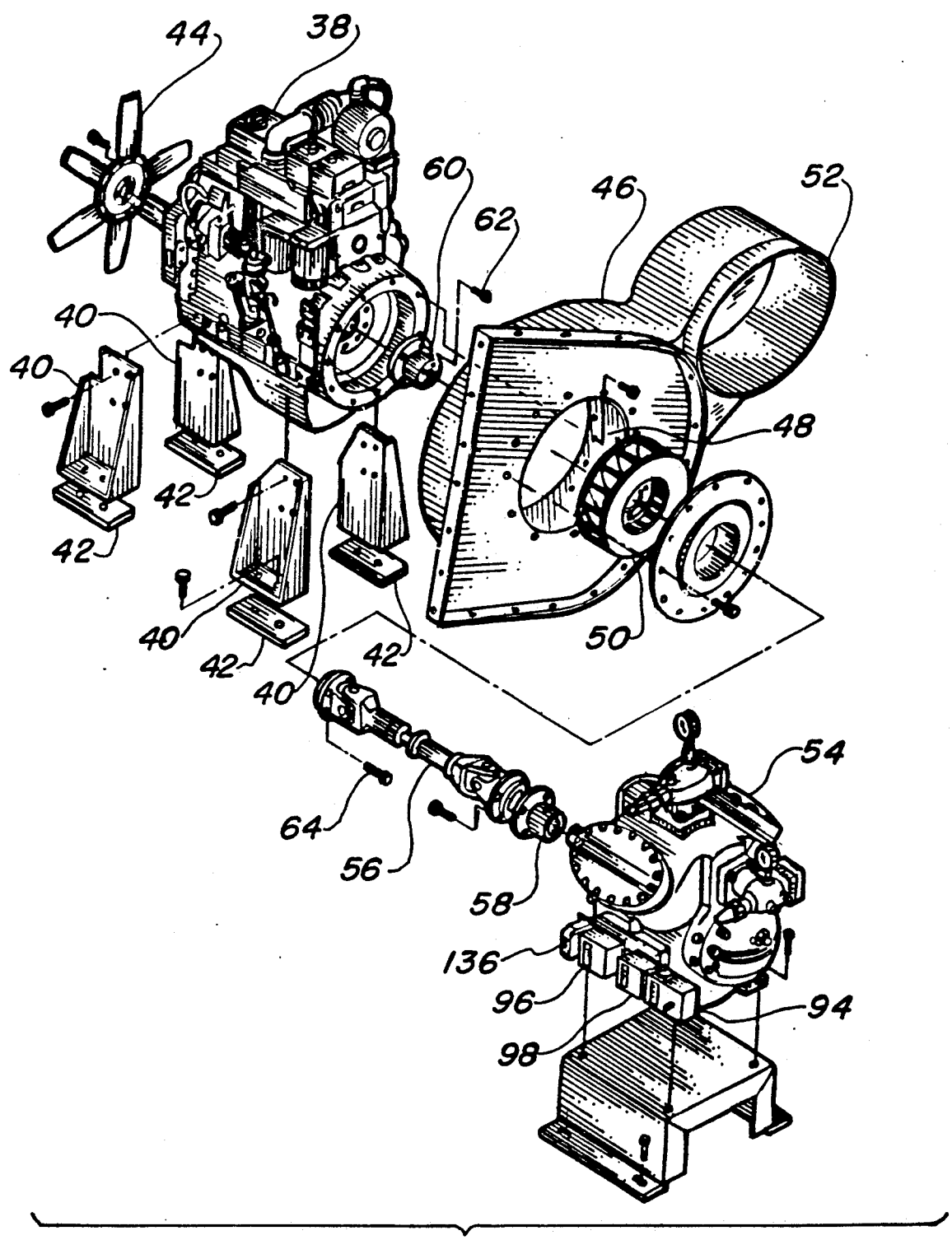
FIG. 3 is an exploded view of the fan, engine blower and refrigerant compressor coupled together in the direct drive arrangement of the preferred embodiment including mounting brackets and drive accessories.

The air conditioner is driven by a single recroprocating engine 38 mounted on the base 20 with engine support brackets 40 and resilient pads 42 shown pictorially in FIG. 3. The engine 38 is the prime mover for the entire air conditioner supplying the only source of mechanical energy. The engine 38 may be a diesel or gasoline fueled internal combustion type having safety shutdown devices as depicted in the Electrical Schematic FIG. 5. The preferred engine is a turbocharged and aftercooled diesel fuel type. In any event a fuel tank is also included for the self contained function and the storage capacity is preferably, for 8 hours of operation.

A propeller fan 44 is mounted on the water pump shaft on the front end of the engine or to the front crankshaft. The fan 44 provides the air motion for all of the heat removal necessary for the function of the unit both engine heat and refrigerant heat of rejection. The propeller fan 44 may be any type such as aluminum, fiberglass or steel blades with steel spider and hub with thermoplastic airfoil profile multi-blade type being preferred. Since the fan 4 is directly mounted onto the engine the requirement for external drives common to the industry such as belts, shafts and bearings are completely eliminated. FIG. 2 illustrates the relationship of the fan to the engine also FIG. 3 depicts the fan removed from the engine in the exploded view.

A centrifugal blower 46 is also directly coupled to the engine. The blower housing 48 is bolted to the flywheel housing and the impeller 50 is attached directly to the engine flywheel. This arrangement again eliminates all external drives and allows the impeller to rotate at the exact speed of the engine. The blower housing 48 contains a novel transverse circular outlet 52 at a right angle plane to the blower housing and impeller, allowing the air to exit at 90 degrees from the outlet without objectionable static pressure losses. This blower housing embodiment allows connection to mating plenums to be made with a single band of SOFT CUFF 46 or flexible material and a pair of band clamps taking only a minimum amount of space making the 90 degree transition and connection. The blower 46 supplies air to the aircraft at sufficient static pressure and flow to accomplish the purpose of the invention.

Figure 4:
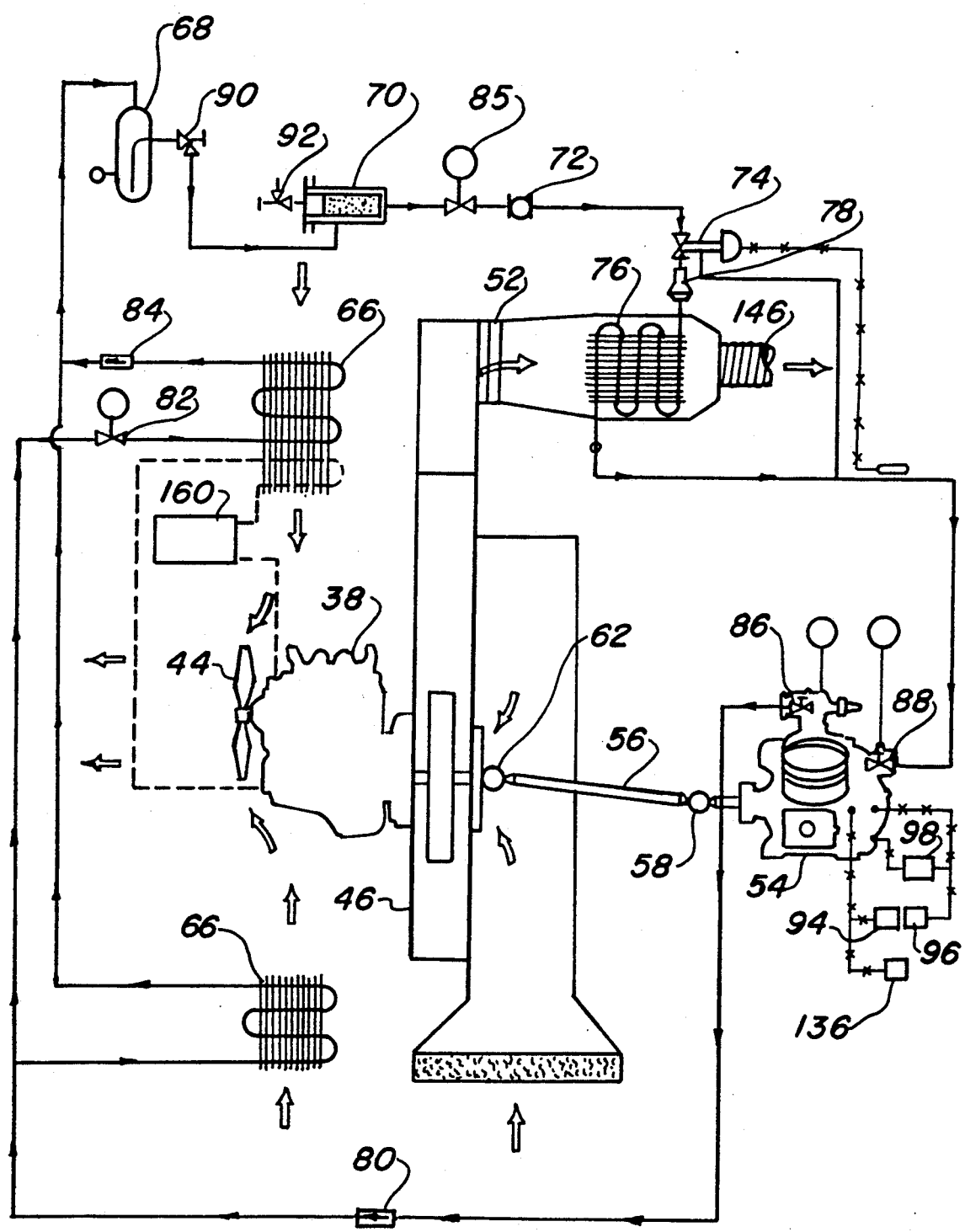
FIG. 4 is a schematic diagram of the refrigerant system illustrating the relationship of all of the operating components. The arrows on the connecting lines indicate direction of refrigerant flow and the separated arrows connotate air direction. Lines with X"s thereon designate a capillary line or control circuit. Dashed lines indicate engine cooling circuitry.

The cooling function of the air conditioner is provided by a vapor cycle refrigeration system schematically depicted in FIG. 4. The unit employs a halogenated hydrocarbon refrigerant, preferably R-22 (dichloromonofluoromethane) which removes the heat from the ambient air entering the unit by evaporating liquid refrigerant absorbing the heat and disposing of it by condensing refrigerant vapor transferring the heat to the atmosphere. The uniqueness of the invention couples a refrigerant compressor 54 directly to the blower impeller 50 which is in turn attached to the flywheel of the engine 38. This coupling arrangement is made by the use of a universal joint drive shaft 56 having a hub 58 connected to the compressor 54 on one end and an adapter 60 simultaneously attached to the flywheel of the engine 38 and the blower impeller 50 on the other. This adapter 60 registers the flywheel on the front, and, both the impeller 50 and the drive shaft 56 on the rear with a first set of fasteners 62 attaching the adapter 60 to the flywheel also a second set 64 sandwich the impeller 50 in between the drive shaft 56. This arrangement simplifies the drive system and eliminates costly machining and close tolerance fits as only a single adapter 60 is required.

The vapor cycle system is well known in art and includes at least one condenser 66, however two are actually preferred in this embodiment, each being connected by copper piping to the compressor 54. Each condenser 66 is the tube and fin type providing the means to dissipate heat created by the compressor allowing the refrigerant to change state from a gas to a liquid while giving up heat to the air passing through. The air movement is created by the propeller fan 44 on the engine 38. A receiver tank 68 is utilized in the circuit downstream of the compressor however it is not essential to the invention yet functions to hold and store liquid refrigerant when in lower ambient conditions so as to not require a critical charge of refrigerant. A filter drier 70 is joined with the piping to the receiver, and functions to remove foreign objects and non-condensibles from the liquid refrigerant. A sight glass 72 is employed in the liquid line downstream from the drier 70 for visual indication of the condition of the refrigerant. An expansion valve 74 having a modulating orifice and external equalizer is connected in the liquid line for metering the flow of refrigerant with an allowance for superheating the refrigerant to insure complete vaporization. An evaporator 76 also using tubes and fins is connected to the expansion valve 74 through a distributor 78. The evaporator 76 functions by removing heat from the air pressurized by the blower 46 through adiabatically expanding the refrigerant from a liquid to a gas. As this direct expansion takes place the latent heat of evaporation assists in extracting heat thereby cooling the air. When the refrigerant has changed state to a gas it is elevated slightly in temperature, commonly known as or superheat, without changing the pressure. The then super-heated gas enters the suction side of the compressor 54 through piping completing a closed loop circulation of the refrigeration in the vapor cycle system.

While the basic elements of the refrigeration system have been described the preferred embodiment contains the following items which improve control and incorporate safety protection, while advantageous, are still not completely necessary for functional operation. A discharge check valve 80 is located upstream from the compressor to prevent liquid from entering the compressor during shutdown. A condenser modulating solenoid valve 82 is located at the inlet of one condenser coil and a condenser check valve 84 is on the outlet allowing isolation of the condenser 66 during low ambient conditions. A liquid solenoid valve 85 is included in the liquid line between the drier 70 and the sight glass 72 allowing the unit to be pumped down accumulating all of the refrigerant in the high pressure side of the system thereby preventing slugging of liquid into the compressor. Service valves include compressor discharge valve 86, compressor suction valve 88, receiver king valve 90 and charging valve 92 on the drier 70. Safety devices further include high pressure switch 94 or low pressure switch 96 and compressor oil failure switch 98 protecting the refrigerant system from abnormal operating conditions.

The recropricating engine 38 is cooled by means integral with the refrigeration system. This cooling is accomplished by utilizing the same air movement created by the propeller fan 44 in conjunction with a separate circuit within one of the condenser coils 66. This condenser contains an additional row of tubes dedicated to the engine jacket water, or radiator section, allowing the air to be drawn through by the fan 44 using the enclosure 22 as a negative plenum. The ambient air enters the condenser coil 66 at the uppermost portion, which is the condensing section, then passes through the bottom portion, which is for engine cooling, and is finally drawn over the engine and other components and discharged through a venturi ring through the front surface of the enclosure 22.

An electrical control circuit is in communication with both the engine and refrigeration system for starting, air conditioning control and safety protection. The circuit is illustrated pictorially in FIG. 5 in its entirety. The starting system within the circuit includes a battery 100, a starter motor 102, a starter solenoid 104, a combination start and run switch 106 also a time delay 108 allowing the engine 38 to start while bypassing the pressure safety device.

Indicating means within the electrical control circuit display the condition of the engine relative to its temperature, pressure etc. These gauges and meters include an engine temperature gauge 110, an engine oil pressure gauge 112, a fuel level gauge 114 a combination engine tachometer and hourmeter 116 with all of the above having senders and back lighting, also an ammeter 118 with illumination is included. Indicators include a low fuel level light 120 that illuminates when fuel requires replenishment.

Safety protection guards the engine and refrigeration system from harmful operation and consists of an engine high temperature cut out switch 122, an engine low oil pressure switch 124 and a refrigeration low pressure switch 98. A circuit breaker 126 electrically protects the wiring from a short circuit or overloaded condition and an emergency stop switch 128 allows manual cutout of all controls and functions.

A pump down system is included within the circuit to allow liquid refrigerant to be stored on the high pressure side of the refrigeration system preventing damage to the compressor 54 if liquid is present in the suction line also helping to prevent undesirable migration of refrigerant to the compressor crankcase. The pump down system operates by closing the liquid solenoid valve 85 when the start/run switch 106 is disengaged allowing the unit to continue to operate until the pressure in the low pressure side of the system is reduced to the setting of the low pressure switch 96 with the unit then automatically shutting down.

The preferred embodiment includes other electrical controls such as a pair of control relays 130, blocking diodes 132, a low fuel switch 134, a condenser modulating pressure switch 136 (in conjunction with its accompanying solenoid valve 82), panel lights 138 with a panel light switch 140, an engine alternator 142 and an engine fuel shut off valve 144 integral with the engine.

While the above described electrical control system forms the preferred embodiment many different schemes may operate equally well and additional accessories and functions may be added or deleted.

While not essential to the invention a heating system may be added to the portable air conditioner providing heat for the aircraft during low ambient temperature conditions. In order to utilize the maximum power from the engine a load is imposed to produce heat directly while allowing the jacket water heat from the engine to be used as a second source.

Figure 8:
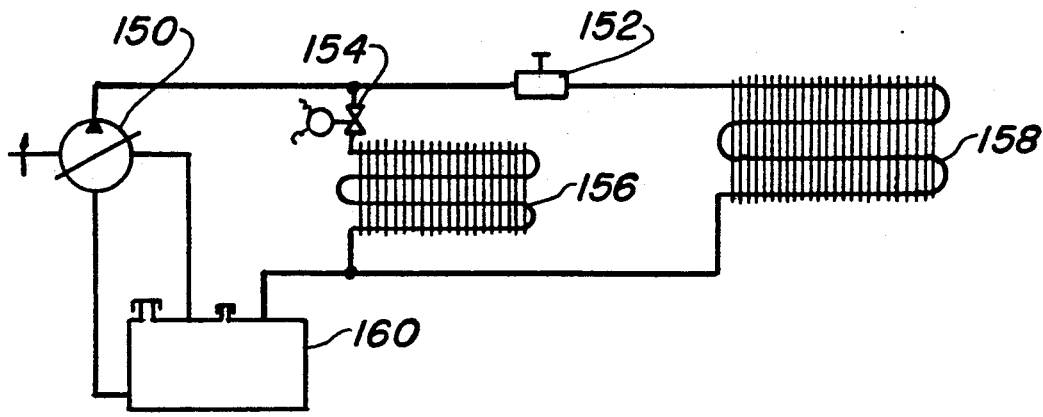
FIG. 8 is a schematic diagram of the hydraulic heating system.

A hydraulic system is employed as the primary heat source and to develop the required power to consume the available horsepower of the engine during this mode of operation. The refrigerant system is disconnected by removing the universal joint drive shaft 56 at the engine flywheel and blower impeller 50 interface. FIG. 8 illustrates the hydraulic system which includes a hydraulic pump 150 with suction and discharge ports. The pump 150 is directly connected to an accessory drive interface on the engine 38 or may be driven from the front crankshaft. The preferred embodiment utilizes an SAE 2 bolt flange mount with a splined shaft directly engaging mating gears on the camshaft accessory drive of the engine.

The hydraulic system uses any type of suitable hydraulic fluid including automatic transmission fluid, engine lubrication oil, high temperature hydraulic fluid or the like and is piped using high pressure tubing and fittings. The pump 150 is connected to orifice means 152 that may consist of a manual valve, fixed orifice, relief valve etc, creating high pressure on the upstream side converting the work of the pump into heat. An electrically actuated solenoid valve 154 is piped in the high pressure side of the system using a tee in the line to allow the fluid to be bypassed when heat is not required. A air to liquid oil cooler 156 is connected to the outlet of the solenoid valve 154 and is positioned in the air stream created by the propeller fan 44. This oil cooler 156 removes the heat from the fluid when heating is not required and the system circulates fluid at a very low pressure. The only heat that is built up by the pump 150 during this non-heating mode of operation is the friction of the pump itself and the pressure differential through the open valve 154 and oil cooler 156 which is basically very low relative to hydraulic systems. A conditioned air to hydraulic fluid heat exchanger 158 is located in the piping downstream from the orifice means 152 on the low pressure side of the system. This heat exchanger 158 is positioned within a discharge plenum adjacent to the evaporator coil 76 within the conditioned air stream created by the blower 46. The conditioned air is heated as it passes through the heat exchanger 158 transferring the heat to the aircraft being serviced while cooling the hydraulic fluid allowing recirculation within the system. A reservoir 160 completes the circuit receiving fluid from either the oil cooler 156 or heat exchanger 158 and supplying a solid head of liquid to the pump suction port for recirculation.

Figure 9:
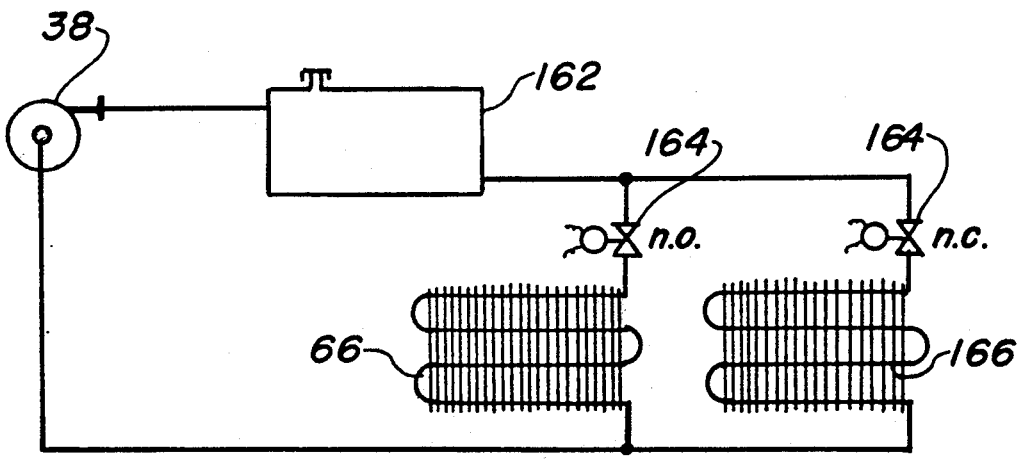
FIG. 9 is a schematic diagram of the engine jacket water heating system.

FIG. 9 illustrates the secondary engine jacket water heating system which consists of an expansion tank 162 connected to the engine water pump outlet. The tank 162 allows the water heated by the engine jacket to expand while still maintaining a pressurized closed loop. Electrically operated valve means 164, in the form of a pair of solenoid valves, one normally open and one normally closed shown in FIG. 9, or a 3-way valve serving the same purpose, is fluidly connected to the outlet of the expansion tank 162. The jacket water flows in only one of the selected directions. The first direction is for maintaining the engine cooling means that is integral with the refrigeration system where water flows into a separate circuit within one of the condensers 66 and back to the inlet of the engine water pump. Secondly when heating is required the valve or valves 164 reverse their position blocking jacket water from entering the condenser and allowing flow to a conditioned air to jacket water heat exchanger 166 is located adjacent to the hydraulic fluid heat exchanger 158 in the evaporator section. Heat is removed from the jacket water and transferred to the conditioned airstream completing that portion of the heating system. It will be noted either system may be used independently however for optimum heating since the engine, is the only source of heat, it must be loaded in order to develop heat in the jacket water. Further with engines of this type operating at low ambient conditions antifreeze in the form of inhibited ethylene glycol is added to the jacket water to prevent freezing.

Figure 5:
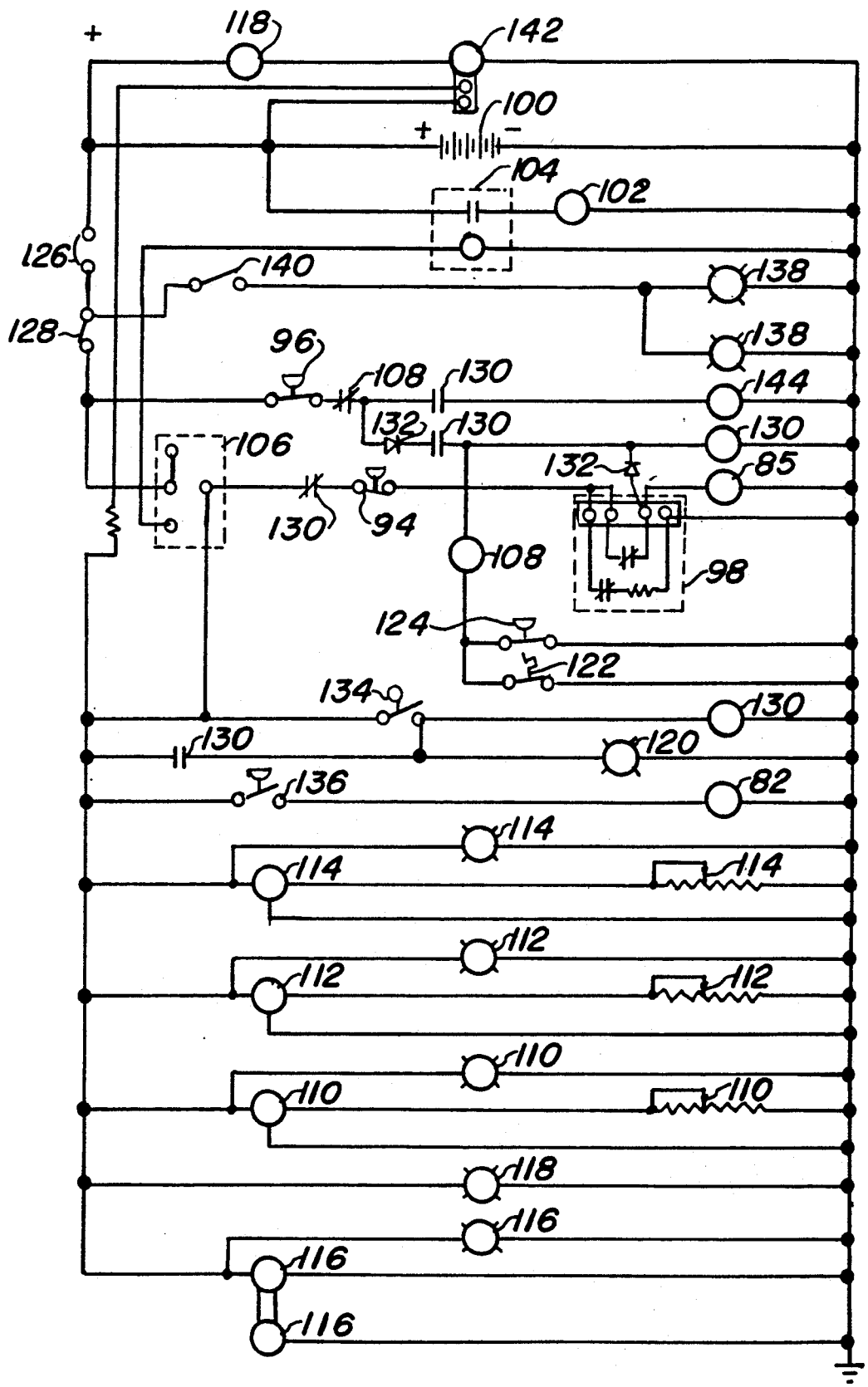
FIG. 5 is an electrical schematic diagram of the unit control circuit.
Figure 10:
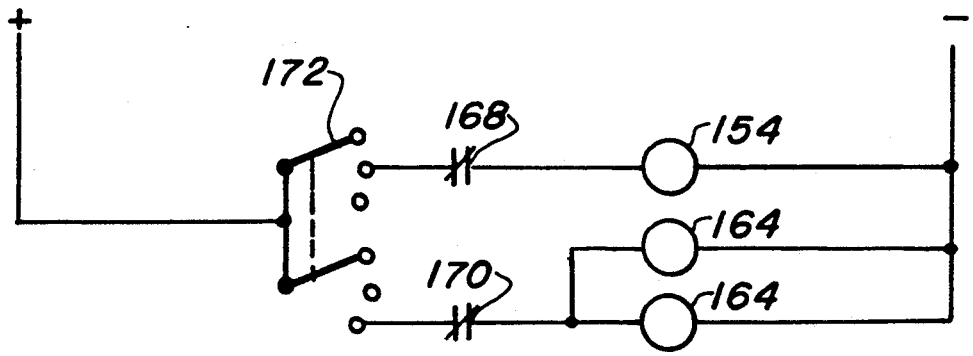
FIG. 10 is an electrical schematic diagram of the control system for the hydraulic and water heating systems shown separately as an additional scheme that may be added to FIG. 9 when a heating option is added to the system.

FIG. 10 illustrates the electrical heating circuit that is integrated into the electrical control circuit depicted in FIG. 5. This control circuit consists of a selector switch 172 with three positions "off", "Partial heating" and "Full heating". This switch 166 may be a rotary type or a double pole 3 position toggle type as shown. A hydraulic heating thermostat 168 senses the leaving conditioned air temperature and modulates the heat by cycling the solenoid valve 154 also protecting the aircraft from overheat. Further a jacket water thermostat 170 similarly controls the water system and also acts as a safety high temperature limiting device. The two thermostats 168 and 170 are set at different temperatures to step the heating function with the hydraulic heat locked in to operate first through the switch 166.

In operation the air conditioner is towed adjacent to an aircraft and the flexible duct 146 having an aircraft adapter 148 is attached to mating fitting in the bottom of the fuselage. The unit is started by energizing the start-/run switch 106. The airflow may be adjusted to meet the requirements of the specific aircraft and the unit automatically cools the interior with no further monitoring or operational procedures required. Shutting the unit down is simply accomplished by reversing the procedures allowing the unit to pump down on its own automatic controls.

While the invention has been described in complete detail and pictorially shown in the accompanying drawings it is not to be limited to such details, since many changes and modifications may be in the invention without departing from the spirit and the scope thereof. Hence, it is described to cover any and all modifications and forms which may come within the language and scope of the appended claims.

We claim:

1. A portable self contained aircraft air conditioner comprising:
   (a) a platform base having an enclosure thereon defining an air plenum,
   (b) a recropricating engine disposed upon the base having a front end and a flywheel rotated by a crankshaft defining a drive end with said engine supplying mechanical energy for the air conditioner,
   (c) a propeller fan drivingly mounted on the front end of the engine providing air motion for heat removal,
   (d) a centrifugal blower directly coupled to the flywheel of the engine for supplying pressurized and conditioned air to an aircraft,
   (e) a vapor cycle refrigeration system having a refrigerant compressor drivingly coupled directly to said blower with said fan providing the air movement from said enclosure for heat of rejection removal from a condenser means of said refrigeration system with the refrigeration effect from an evaporation means of the system transmitted to the aircraft by air movement developed by said blower,
   (f) engine cooling means integral with said condenser means of said refrigeration system additionally utilizing air movement from said enclosure by the fan for removing engine jacket heat, and
   (g) an electrical control circuit means in communication with the engine and refrigeration system having means for air conditioning control and safety protection of said engine and refrigeration system.

2. The air conditioner as recited in claim 1 further comprising running gear fixability attached to said platform base having a pair of tandem wheels on each side thereof each pair of wheels spaced together less than half of the diameter of one wheel, with the center of gravity of the air conditioner located in such a manner as to make further support unnecessary.

3. The air conditioner as recited in claim 1 wherein said recropricating engine further comprises a diesel internal combustion engine having safety shut-off devices and also fuel storage means.

4. The air conditioner as recited in claim 1 wherein said recropricating engine further comprises a gasoline internal combustion engine having safety shut-off devices and also gasoline storage means.

5. The air conditioner as recited in claim 1 wherein said propeller fan further comprises an adjustable pitch two piece die cast metallic hub and thermoplastic airfoil profile multi-blade fan disposed directly upon a register on the front end of the engine.

6. The air conditioner as recited in claim 1 wherein said blower further comprises a transverse circular outlet at a right angle to the plane of the blower allowing air circulated by the blower to exit at a direction 90 degrees therefrom.

7. The air conditioner as recited in claim 1 wherein said compressor drivingly coupled to the blower further comprises a universal joint drive shaft having a hub connected to the compressor on one end and an adapter simultaneously embracing the engine flywheel and blower on the other contiguously juxtapositioned thereon.

8. The air conditioner as recited in claim 1 wherein said vapor cycle refrigeration system further comprises:
   a halogenated hydrocarbon refrigerant for removing heat from the air by evaporating liquid refrigerant and disposing of the heat by condensing refrigerant vapor,
   at least one condenser in refrigerant communication with the compressor providing means to dissipate heat created by refrigerant compressor heat of compression allowing air moved by the fan to extract heat therefrom,
   a liquid receiver tank connected fluidly to said condenser for holding and storing liquid refrigerant,
   a filter drier fluidly joined to the receiver for removing foreign objects and non-condensables from the refrigerant while in liquid form,
   at least one expansion valve having a modulating orifice therein connected to the drier for metering liquid refrigerant flow with said orifice,
   an evaporator disposed contiguously with expansion valve removing heat from pressurized air supplied by the blower through adiabatically expanding refrigerant from a liquid to a gas, and
   said evaporator connected to said compressor in a closed loop manner allowing a flow of refrigerant to circulate within the system.

9. The air conditioner as recited in claim 8 wherein said engine cooling means further comprises a heat exchanging radiator section integral with said condenser coil of the refrigeration system jointly utilizing the air motion of said fan to extract and remove engine heat 10. The air conditioner as recited in claim 1 wherein said electrical control circuit means further comprises:
   a starting system within the circuit means for commencing operation of said engine, indicating means within the circuit means for displaying the condition of the engine relative to its temperature and oil pressure,
   safety protection within the circuit means to preserve the integrity of the engine and refrigeration system, and
   a pump down system within the circuit means to allow liquid refrigerant to be stored on a high pressure side of the refrigeration system to preclude damage to the refrigerant compressor from pumping liquid refrigerant or migration of liquid refrigerant to said compressor crankcase, 11. The air conditioner as recited claim 1 further comprising an integral heating system providing pressurized and heated air to an aircraft during periods of low ambient temperatures.

12. The air conditioner as recited in claim 11 wherein said heating system further comprises
   (a) a hydraulic fluid system having;
      a hydraulic pump with suction and discharge ports, directly coupled to said engine,
      orifice means in communication with said pump discharge port providing a restriction creating an elevated fluid pressure sufficient to produce heat within the fluid,
      an electrically actuated solenoid valve between said pump and said orifice means allowing the fluid to be bypassed when heat is not required,
      an air to liquid oil cooler fluidly joined to said solenoid valve in alignment with the air motion of the propeller fan for heat removal when said solenoid valve is opened and pressure is not restricted by said orifice,
      a conditioned air to hydraulic fluid heat exchanger downstream of said orifice means juxtapostioned with said refrigeration system and in the air stream created by the blower receiving said hydraulic fluid heated by the restriction of the orifice means transferring heat to the pressurized and conditioned air to the aircraft, and
      a reservoir in communication with the oil cooler, heat exchanger and hydraulic pump, receiving and storing hydraulic fluid from the oil cooler and heat exchanger also supplying fluid to the suction port of the pump,
   (b) an engine jacket water system having;
      said recropricating engine containing a water pump with an inlet and outlet for circulating jacket water to cool the engine,
      an expansion tank fluidly connected to the outlet of said engine water pump allowing for expansion of the water when heated,
      electrically operated valve means fluidly connected to the expansion tank allowing the jacket water to flow in only one of two selected directions for directing water to the engine cooling means integral with the refrigerant system or directing it into said heating system, and
      a conditioned air to jacket water heat exchanger juxtapostioned with said hydraulic fluid heat exchanger within the air stream created by the blower receiving said jacket water circulated by the pump that has been heated by the engine jacket and directed to the heating system by the valve means transferring heat to the pressurized and conditioned air to the aircraft, and
   (c) a heating circuit means integrated into said electrical control circuit means having;
      a selector switch within the circuit for controlling the operation of the heating system energizing the solenoid valve for hydraulic fluid heating and said electrically operated valve means for engine jacket heating connected in such a manner as to allow the hydraulic fluid heat to operate in conjunction with the jacket water heat and secondarily allowing the engine to be loaded sufficiently with the hydraulic system to produce heat in the jacket water system, further having a pair of thermostats one for hydraulic heating and one for jacket water heating, that limit and control the leaving temperature of the conditioned air 13. A self propelled portable unitary aircraft air conditioner comprising:
   (a) a truck chassis having an engine, a cab and a frame,
   (b) a platform base having an enclosure thereon defining an air plenum permanently affixed to the frame of said chassis,
   (c) a recropricating engine deposed upon the base having a front end and a flywheel rotated by a crankshaft defining a drive end with said engine supplying mechanical energy for the air conditioner, (d) a propeller fan drivingly mounted on the front end of the engine providing air motion for heat removal, (e) a centrifugal blower mounted to the flywheel of the engine for supplying pressurized and conditioned air to an aircraft, (f) a vapor cycle refrigeration system having a refrigerant compressor drivingly coupled directly to said blower with said fan providing the air movement from said enclosure for heat of rejection removal from a condenser means of said refrigeration system with the refrigeration effect from an evaporator means of the system transmitted to the aircraft by air movement developed by said blower, (g) engine cooling means integral with said condenser means of said refrigeration system additionally utilizing air movement from said enclosure by the fan for removing engine jacket heat, and (h) an electrical control circuit means in communication with the engine and refrigeration system having means for air conditioning control and safety protection of said engine and refrigeration system.

14. A skid mounted unitary aircraft air conditioner comprising:

(a) a skid mounted platform base having a enclosure thereon defining an air plenum and a pair of fork lift slots for lifting the air conditioner, (b) a recropricating engine deposed upon the base having a front end and a flywheel rotated by a crankshaft defining a drive end with said engine supplying mechanical energy for the air conditioner, (c) a propeller fan drivingly mounted on the front end of the engine providing air motion for heat removal, (d) a centrifugal blower mounted coupled to the flywheel of the engine for supplying pressurized and conditioned air to an aircraft, (e) a vapor cycle refrigeration system having a refrigerant compressor drivingly coupled directly to said blower with said fan providing the air movement from said enclosure for heat of rejection removal from a condenser said refrigeration system with the refrigeration effect from an evaporator means of the system transmitted to the aircraft by air movement developed by said blower, (f) engine cooling means integral with said condenser means of said refrigeration system additionally utilizing air movement from said enclosure by the fan for removing engine jacket heat, and (g) an electrical control circuit means in communication with the engine and refrigeration system for air conditioning control and safety protection of said engine and refrigeration system.

* * * * *